UNITED STATES PATENT OFFICE.

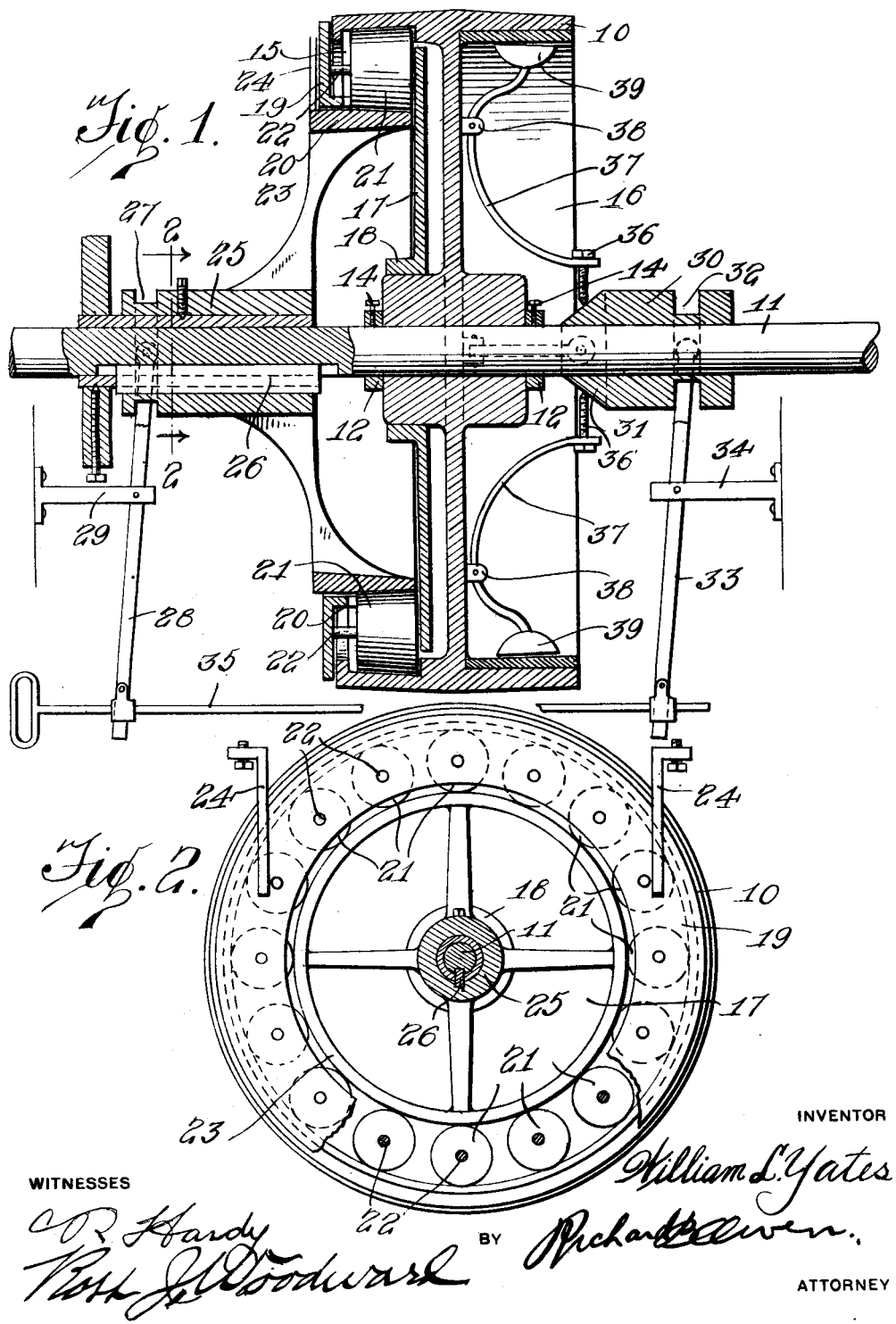

WILLIAM L. YATES, OF HUTCHINSON, KANSAS.

PULLEY AND ACTUATING MECHANISM.

1,193,214.     Specification of Letters Patent.     Patented Aug. 1, 1916.

Application filed October 18, 1915. Serial No. 56,467.

*To all whom it may concern:*

Be it known that I, WILLIAM L. YATES, a citizen of the United States, residing at Hutchinson, in the county of Reno and State of Kansas, have invented certain new and useful Improvements in Pulleys and Actuating Mechanisms, of which the following is a specification.

This invention relates to an improved pulley and the principal object of the invention is to provide actuating means for the pulley, the actuating means being so constructed that the pulley may be caused to turn either in the same direction with the shaft upon which it is mounted or in the reverse direction.

Another object of the invention is to so construct this actuating mechanism that by moving a shifting lever, the actuating mechanism may be shifted from one position to another and thus the rotation of the pulley easily controlled.

Another object of the invention is to so construct this actuating mechanism that it may be slidably mounted upon the shaft upon which the pulley is rotatably mounted.

This invention is illustrated in the accompanying drawings, wherein:—

Figure 1 is a view showing the pulley and actuating mechanism in section and the shaft partially in section and partially in elevation. Fig. 2 is a view showing the pulley in elevation with the shaft in section and roller carrying device partially in elevation and broken away and partially in section.

The pulley wheel 10 is rotatably mounted upon the shaft 11 and is prevented from having longitudinal movement upon the shaft by means of the abutment collars 12 positioned upon the shaft upon opposite sides of the hub 13 of the pulley wheel and held in place by means of the set screws 14. This pulley has one side of its rim provided with a depression forming a seat 15 and is provided upon the opposite side with a covering 16 which is formed of leather or some other suitable material.

In order to cause the pulley to rotate in a direction opposite to the rotation of the shaft 11 there has been provided the structure shown at the left of Fig. 1. A disk 17 is rotatably mounted upon the hub 13 of the pulley wheel, a flange or sleeve 18 being provided at the center of the disk 17 in order to provide a good bearing surface and support for the disk. This disk is provided with an extension forming a trough 19, the bottom of which is provided with openings 20 through which the rollers 21 extend. These rollers 21 are rotatably supported by means of the axles or pins 22 and are of sufficient size to engage the rim of the pulley wheel as clearly shown in Fig. 1. It should be noted that these rollers taper in order to provide a wedging action when the clutch 23 is in the operative position shown. Brackets 24 are provided to securely hold the disk 17 stationary thus permitting the pulley to be rotated when the rollers 21 rotate. This clutch 23 includes a sleeve 25 which is slidably mounted upon the shaft 11 and is keyed to the shaft as shown at 26 thus permitting the clutch to be moved longitudinally of the shaft but at the same time caused to rotate with the shaft. The outer end portion of the sleeve or hub 25 is provided with a groove 27 forming a seat for the shifting lever 28 which is fulcrumed by means of brackets 29 carried by a suitable support. Therefore by moving the lever 28 the clutch may be moved into and out of frictional engagement with the rollers. When the clutch is out of engagement with the rollers the shaft 11 may rotate without the pulley being actuated by means of the mechanism already described but when the clutch is moved into engagement with the rollers as shown the rotation of the clutch will rotate the rollers in the opposite direction to the rotation of the shaft and rotation of these rollers will cause the pulley to rotate in the same direction as the rollers and in an opposite direction to the rotation of the shaft.

Upon the opposite side of pulley 10 there is a block 30 slidably mounted upon the shaft 11 and turning with the same, the block having a tapered forward end portion 31 and having its outer end portion provided with a groove 32 to receive the free end portion of the shifting lever 33. This shifting lever 33 is fulcrumed by means of brackets 34 and when moved will slide the block 30 along the shaft. A rod 35 is connected with the levers 28 and 33 and from an inspection of Fig. 1 it will be readily seen that by moving this rod, both of the levers can be moved and the clutch 23 and block 30 moved at the same time, one being moved to an operative position and the other to an inoperative position. The tapered end of this block 30 is engaged by the screws 36 of the arms 37, the arms 37 being pivotally connected with the lugs 38 of the pulley and having their outer ends provided with heads 39 which are brought into engagement with the leather covering 16 when block 30 moves to an operative position. When this pulley is in use the shaft 11 will rotate continuously and if it is desired to have the pulley rotate in the same direction that the shaft rotates the rod 35 will be moved to bring block 30 into tight engagement with the screws 36 of arms 37. These arms will be rocked upon their pivots 38 to bring the heads 39 into tight engagement with the covering 16 and the pulley will then turn with the shaft. If it is desired to reverse the direction in which the pulley rotates, the rod 35 will be moved in the opposite direction thus swinging block 30 to an inoperative position and moving clutch 23 into tight engagement with the rollers. When in this position the rollers are rotated as previously described and the pulley caused to rotate in the opposite direction. Of course if it is not desired to have this pulley rotate but at the same time have the shaft continue its rotation, the rod 35 can be moved about one half the usual distance thus leaving both clutches inoperative.

I have thus provided a pulley which is so constructed and mounted that it may rotate upon the shaft in the same direction as the rotation of the shaft or in an opposite direction and have further provided improved clutch means for controlling the direction of the rotation of the pulley.

What is claimed is:—

1. A rotatable shaft, a pulley wheel rotatably mounted upon said shaft and held against longitudinal movement upon said shaft, a sleeve slidably mounted upon said shaft to one side of said pulley wheel and rotating with the shaft, a rim carried by said sleeve, a cam block slidably mounted upon said shaft upon the opposite side of said pulley wheel and turning with said shaft, arms pivotally connected with said pulley wheel and having their inner ends positioned for engagement with said cam block and having their outer ends positioned to engage the rim of the pulley wheel when the block is moved to an operative position, a disk loosely mounted upon the hub of said pulley wheel, rollers carried by said disk and engaging the rim of said pulley wheel, means for holding said disk stationary, and means for shifting said sleeve and block to bring the rim of said sleeve into engagement with said rollers when said block is out of an operative position and to bring said block into an operative position when said sleeve is in an inoperative position.

2. A rotatable shaft, a pulley wheel rotatably mounted upon said shaft, said pulley wheel including a hub and rim, a disk loosely mounted upon the hub of said pulley wheel, a trough carried by said disk and provided with openings in the bottom thereof, rollers rotatably mounted in said trough and extending through the openings in the bottom of the trough, said rollers engaging the rim of said pulley wheel, arms carried by said pulley wheel on the opposite side thereof from said disk, a sleeve slidably mounted upon said shaft upon one side of said pulley wheel and provided with a rim for engaging said rollers when said sleeve is in an operative position, a cam block slidably mounted upon said shaft on the opposite side of the pulley wheel from the sleeve for engaging said arm when in an operative position and means for shifting said sleeve and block upon said shaft to move one into an operative position and the other to an inoperative position.

3. A rotatable shaft, a pulley wheel rotatably mounted upon said shaft, a cam block slidably mounted upon said shaft to one side of said pulley wheel and provided with a tapered inner end portion, a gripping arm pivotally connected with said pulley wheel and engaged by the tapered inner end portion of the clutch when the clutch is moved to an operative position, a stationary support positioned upon the opposite side of said pulley wheel and having its edge portion provided with a trough, rollers rotatably mounted in said trough and extending through openings formed in the bottom of the trough to engage said pulley wheel, a sleeve slidably mounted upon said shaft and including a rim, and means for moving said sleeve and block into and out of an operative position, the rim of the sleeve when moved to an operative position being inclosed by said trough and engaging said rollers to rotate the same and drive the pulley in an opposite direction to the rotation of said shaft.

In testimony whereof I affix my signature in presence of two witnesses.

WILLIAM L. YATES.

Witnesses:
C. A. BAINUM,
BEN DOWNING.

Copies of this patent may be obtained for five cents each, by addressing the "Commissioner of Patents, Washington, D. C."